US009664090B2

(12) United States Patent
Uchiyama et al.

(10) Patent No.: US 9,664,090 B2
(45) Date of Patent: May 30, 2017

(54) EXHAUST PURIFICATION DEVICE FOR INTERNAL COMBUSTION ENGINE

(71) Applicant: ISUZU MOTORS LIMITED, Tokyo (JP)

(72) Inventors: Tadashi Uchiyama, Kamakura (JP); Mitsuhiro Aso, Yokohama (JP); Masafumi Noda, Kawasaki (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 14/768,577

(22) PCT Filed: Feb. 18, 2014

(86) PCT No.: PCT/JP2014/053737
§ 371 (c)(1),
(2) Date: Oct. 29, 2015

(87) PCT Pub. No.: WO2014/129449
PCT Pub. Date: Aug. 28, 2014

(65) Prior Publication Data
US 2016/0053654 A1      Feb. 25, 2016

(30) Foreign Application Priority Data

Feb. 22, 2013   (JP) ................................. 2013-033286

(51) Int. Cl.
*F01N 11/00* (2006.01)
*F01N 9/00* (2006.01)
(Continued)

(52) U.S. Cl.
CPC ............ *F01N 11/00* (2013.01); *F01N 3/0231* (2013.01); *F01N 3/0253* (2013.01);
(Continued)

(58) Field of Classification Search
CPC .... F01N 3/0231; F01N 3/0235; F01N 3/0275; F01N 3/2026; F01N 3/2066; F01N 9/002;
(Continued)

(56) References Cited

U.S. PATENT DOCUMENTS 4,923,484 A *   5/1990   Saito ...................... F01N 3/0222
                                                                 55/283
9,010,097 B2 *  4/2015   Inoue .................... F02D 41/405
                                                                 422/168
(Continued)

FOREIGN PATENT DOCUMENTS

JP          2007-255345         10/2007
JP          2008-231950         10/2008
(Continued)

OTHER PUBLICATIONS

Patent Abstracts of Japan, Publication No. 2009-243316, published Oct. 22, 2009.
(Continued)

*Primary Examiner* — Jorge Leon, Jr.
(74) *Attorney, Agent, or Firm* — Staas & Halsey LLP

(57) ABSTRACT

An exhaust gas purification device includes a diesel particulate filter (DPF) that collects particulate matter (PM) from an exhaust gas, a urea water spray unit that sprays urea water into the exhaust gas, a selective catalytic reduction (SCR) device that reduces and purifies $NO_x$ of the exhaust gas, a capacitance detecting unit that detects capacitance of the DPF, a PM accumulation calculating unit that calculates an amount of accumulated PM on the basis of the capacitance, an $NO_2$ consumption estimating unit that calculates an amount of consumed $NO_2$ on the basis of the amount of accumulated PM, and a control unit that controls an engine such that a ratio of NO to $NO_2$ flowing into the SCR approaches 1:1 on the basis of the estimated consumption.

6 Claims, 3 Drawing Sheets

(51) Int. Cl.
  *F01N 3/025* (2006.01)
  *F01N 3/027* (2006.01)
  *F01N 3/031* (2006.01)
  *F01N 3/035* (2006.01)
  *F02D 41/02* (2006.01)
  *F01N 13/00* (2010.01)
  *F01N 3/20* (2006.01)
  *F01N 3/023* (2006.01)
  *B01D 53/94* (2006.01)

(52) U.S. Cl.
  CPC .......... *F01N 3/0275* (2013.01); *F01N 3/031* (2013.01); *F01N 3/035* (2013.01); *F01N 3/2066* (2013.01); *F01N 9/002* (2013.01); *F01N 13/009* (2014.06); *F02D 41/0235* (2013.01); *B01D 53/944* (2013.01); *B01D 53/9431* (2013.01); *B01D 53/9477* (2013.01); *B01D 53/9495* (2013.01); *F01N 3/0235* (2013.01); *F01N 3/2026* (2013.01); *F01N 13/011* (2014.06); *F01N 2240/16* (2013.01); *F01N 2410/00* (2013.01); *F01N 2430/00* (2013.01); *F01N 2550/04* (2013.01); *F01N 2550/12* (2013.01); *F01N 2560/05* (2013.01); *F01N 2560/12* (2013.01); *F01N 2610/02* (2013.01); *F01N 2610/1453* (2013.01); *F01N 2900/0601* (2013.01); *F01N 2900/1402* (2013.01); *F01N 2900/1606* (2013.01); *F01N 2900/1614* (2013.01); *Y02T 10/24* (2013.01); *Y02T 10/47* (2013.01)

(58) Field of Classification Search
  CPC .. F01N 13/009; F01N 13/011; F01N 2240/16; F01N 2410/00; F01N 2430/00; F01N 2560/12; F01N 2610/02; F01N 2610/1453; F01N 2900/1402; F01N 2900/1606
  USPC ......... 60/275, 285, 286, 287, 295, 297, 300, 60/301, 303, 311, 320, 324
  See application file for complete search history.

(56) References Cited

U.S. PATENT DOCUMENTS

| | | | |
|---|---|---|---|
| 2009/0217644 A1* | 9/2009 | Jung | F01N 3/208 60/276 |
| 2009/0309571 A1 | 12/2009 | Katsuyama et al. | |
| 2010/0242456 A1* | 9/2010 | Konstandopoulos | F01N 13/0093 60/311 |
| 2011/0167801 A1* | 7/2011 | Massner | F01N 13/009 60/274 |
| 2011/0289903 A1* | 12/2011 | Doring | F01N 3/0231 60/274 |
| 2012/0117954 A1* | 5/2012 | Yasui | F01N 3/208 60/301 |
| 2012/0186228 A1* | 7/2012 | Yacoub | F01N 3/031 60/274 |
| 2012/0318055 A1* | 12/2012 | Uchiyama | F01N 11/002 73/114.69 |
| 2013/0232958 A1* | 9/2013 | Ancimer | F01N 3/035 60/301 |
| 2014/0230532 A1* | 8/2014 | Huq | F01N 11/00 73/114.69 |

FOREIGN PATENT DOCUMENTS

| | | |
|---|---|---|
| JP | 2009-97410 | 5/2009 |
| JP | 2009-243316 | 10/2009 |
| JP | 2012-12983 | 1/2012 |
| JP | 2012-52510 | 3/2012 |
| JP | 2013-2283 | 1/2013 |
| WO | WO 2008/117853 A1 | 10/2008 |

OTHER PUBLICATIONS

Patent Abstracts of Japan, Publication No. 2013-2283, published Jan. 7, 2013.
Patent Abstracts of Japan, Publication No. 2012-12983, published Jan. 19, 2012.
Patent Abstracts of Japan, Publication No. 2012-52510, published Mar. 15, 2012.
Patent Abstracts of Japan, Publication No. 2007-255345, published Oct. 4, 2007.
Patent Abstracts of Japan, Publication No. 2009-97410, published May 7, 2009.
Patent Abstracts of Japan, Publication No. 2008-231950, published Oct. 2, 2008.
International Search Report mailed May 13, 2014, in corresponding International Application No. PCT/JP2014/053737.
International Preliminary Report on Patentability dated Aug. 25, 2015 in corresponding International Patent Application No. PCT/JP2014/053737.
Extended European Search Report dated Aug. 22, 2016 in corresponding European Patent Application No. 14753870.6.

* cited by examiner

EXHAUST PURIFICATION DEVICE FOR INTERNAL COMBUSTION ENGINE

CROSS-REFERENCE TO RELATED APPLICATIONS

This application is a U.S. National Stage Application, which claims the benefit under 35 U.S.C. §371 of PCT International Patent Application No. PCT/JP2014/053737, filed Feb. 18, 2014, which claims the foreign priority benefit under 35 U.S.C. §119 of Japanese Patent Application No. 2013-033286, filed Feb. 22, 2013, the contents of which are incorporated herein by reference.

TECHNICAL FIELD

The present invention relates to an exhaust gas purification device of an internal combustion engine.

BACKGROUND ART

A diesel particulate filter (hereinafter referred to as "DPF"), for example, is known as a filter for collecting particulate matter (hereinafter referred to as "PM") in an exhaust gas emitted from a diesel engine.

Also, a selective catalytic reduction (hereinafter referred to as "SCR") catalyst is known as a nitrogen compound (hereinafter referred to as "NOx") catalyst for purifying NOx in an exhaust gas. The SCR catalyst selectively reduces and purifies NOx in the exhaust gas by using ammonia ($NH_3$) produced from a urea solution (urea water) upon hydrolysis with heat of the exhaust gas. In the SCR catalyst, in particular when the exhaust gas temperature is low, NOx (nitrogen monoxide or NO, and nitrogen dioxide or $NO_2$) in the exhaust gas reacts with ammonia ($NH_3$) according to the following chemical equation and is purified.

$$2NH_3 + NO + NO_2 \rightarrow 2N_2 + 3H_2O \qquad \text{Equation (1)}$$

In order to improve the purification rate of NOx in the SCR catalyst, it is preferred that the ratio of NO to $NO_2$ be kept at 1 to 1.

LISTING OF REFERENCES

PATENT LITERATURE 1: Japanese Patent Application Laid-Open Publication (Kokai) No. 2013-2283
PATENT LITERATURE 2: Japanese Patent Application Laid-Open Publication (Kokai) No. 2009-243316

SUMMARY OF THE INVENTION $NO_2$ in the exhaust gas tends to react with PM collected by a DPF and be consumed. Therefore, to keep the ratio of NO to $NO_2$ in the exhaust gas flowing into a downstream SCR catalyst at 1 to 1, the amount of accumulated PM collected by the upstream DPF may be measured with high accuracy, and the purification rate of the SCR catalyst can thus be improved.

The present invention has been made in such a viewpoint, and an object of the present invention is to effectively improve the NOx purification rate by precisely controlling the ratio of NO to $NO_2$ in the exhaust gas flowing into the SCR catalyst.

To achieve the above-mentioned object, an exhaust gas purification device of an internal combustion engine according to the present invention includes a filter that is provided in an exhaust passage of the internal combustion engine and configured to collect particulate matter in an exhaust gas; a urea water spraying unit that is provided in the exhaust passage downstream of the filter and configured to spray urea water into the exhaust gas; a selective catalytic reduction catalyst that is provided in the exhaust passage downstream of the urea water spraying unit and configured to reduce and purify a nitrogen compound in the exhaust gas by using ammonia produced from the urea water; an electrostatic capacity detecting unit that is configured to detect an electrostatic capacity (capacitance) of the filter; an accumulation amount estimating unit that is configured to estimate an amount of accumulated particulate matter collected by the filter, on the basis of the detected electrostatic capacity; a consumption amount calculating unit that is configured to calculate an amount of nitrogen dioxide consumed by the particulate matter that has accumulated in the filter, on the basis of the estimated amount of accumulated particulate matter; and a controlling unit that is configured to control a combustion state of the internal combustion engine such that a ratio of nitrogen monoxide to nitrogen dioxide in the exhaust gas flowing into the selective catalytic reduction catalyst approaches 1 to 1, on the basis of the calculated amount of consumed nitrogen dioxide.

In order to improve the purification rate of NOx in the SCR catalyst, it is preferred that the ratio of NO to $NO_2$ be kept at 1 to 1.

The electrostatic capacity detecting unit may include a pair of electrodes disposed in a corresponding pair of cells that oppose each other with at least one cell in the filter interposed therebetween.

The exhaust gas purification device may further include a bypass passage that branches off from the exhaust passage at a position upstream of the filter so as to bypass the filter, and a second filter that is provided in the bypass passage and configured to collect particulate matter in the exhaust gas flowing through the bypass passage. The paired electrodes may be disposed in a corresponding pair of cells that oppose each other with at least one cell in the second filter interposed therebetween.

When a forced regeneration is carried out in the second filter, the paired electrodes may function as a heater.

According to the exhaust gas purification device of an internal combustion engine according to the present invention, the NOx purification rate can be effectively improved by precisely controlling the ratio of NO to $NO_2$ in the exhaust gas flowing into the SCR catalyst.

DETAILED DESCRIPTION

Figure 1:
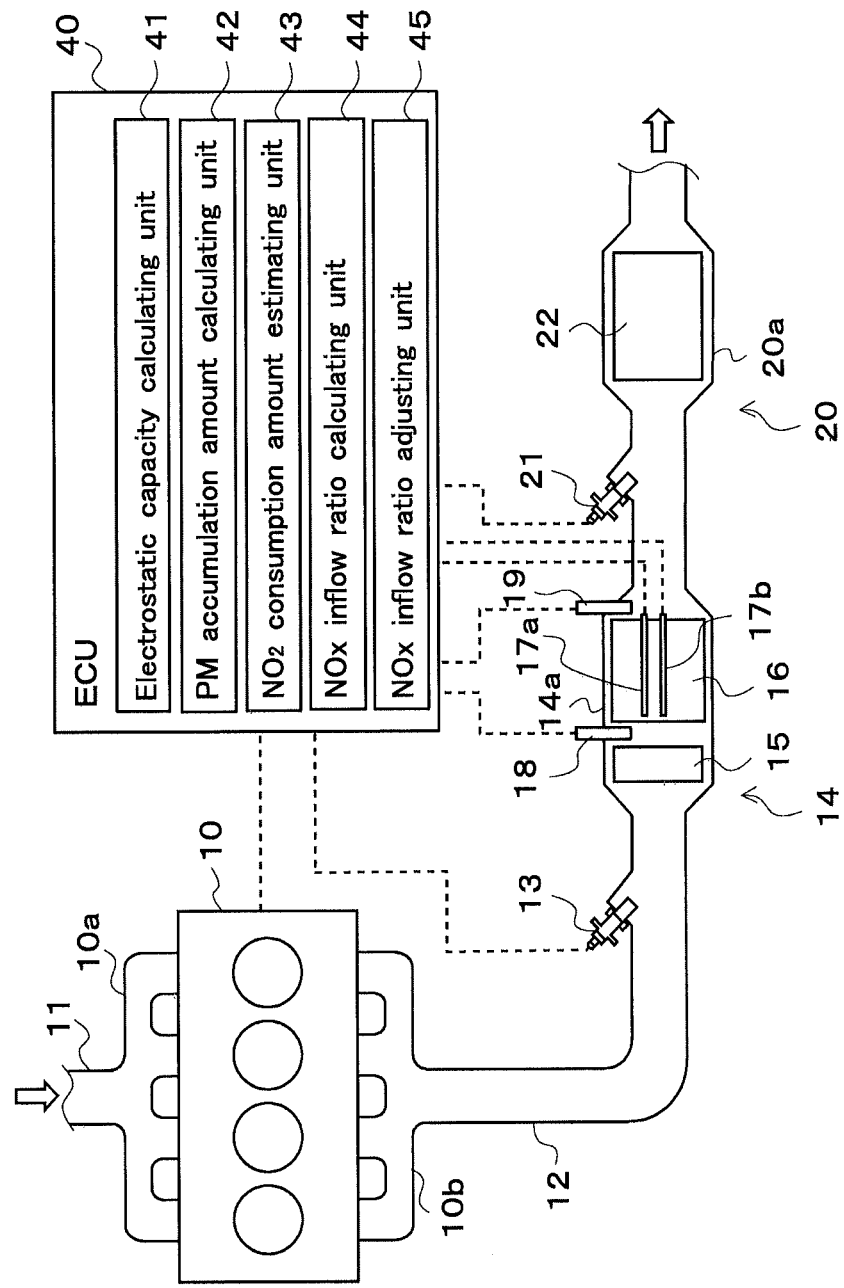
FIG. 1 is an overall configuration diagram schematically illustrating an exhaust gas purification device of an internal combustion engine according to an embodiment of the present invention.

Hereinafter, with reference to FIGS. 1 and 2, an exhaust gas purification device of an internal combustion engine according to embodiments of the present invention will be described. Identical parts are given identical reference numerals and symbols, and their names and functions are identical as well. Therefore, detailed description of such parts will not be repeated.

Figure 2:
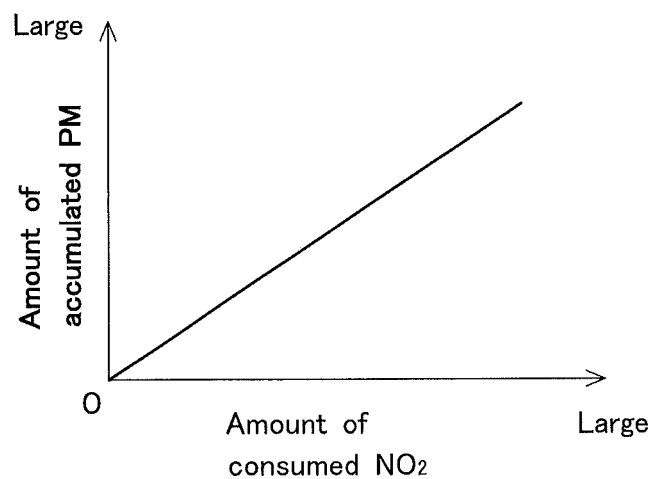
FIG. 2 illustrates an exemplary map for calculating an amount of consumed NO2 from the amount of accumulated PM in the exhaust purification gas device of the internal combustion engine according to an embodiment of the present invention.

As illustrated in FIG. 1, a diesel engine (hereinafter, simply referred to as "engine") 10 has an intake manifold 10a and an exhaust manifold 10b. An intake passage 11 for introducing fresh air is connected to the intake manifold 10a, and an exhaust passage 12 for discharging an exhaust gas to the atmosphere is connected to the exhaust manifold 10b. A pre-stage (upstream) post-treatment device 14 and a post-stage (downstream) post-treatment device 20 are provided in the exhaust passage 12. The pre-stage post-treatment device 14 is arranged upstream of the post-stage post-treatment device 20.

The pre-stage post-treatment device 14 is constituted by a diesel oxidation catalyst (hereinafter referred to as "DOC") 15 and a DPF 16 disposed in a casing 14a. The DOC 15 is arranged upstream of the DPF 16. An in-pipe injection device 13 is provided upstream of the DOC 15. A DPF inlet temperature sensor 18 is provided upstream of the DPF 16. A DPF outlet temperature sensor 19 is provided downstream of the DPF 16.

The in-pipe injection device 13 injects unburned fuel (primarily HC) into the exhaust passage 12, in response to an instruction signal from an electronic control unit (hereinafter referred to as "ECU") 40. The in-pipe injection device 13 may be omitted if post-injection through multiple-injection of the engine 10 is carried out.

The DOC 15 includes, for example, a ceramic carrier having a cordierite honeycomb structure, with a catalyst component supported on a surface of the ceramic carrier. Upon unburned fuel (primarily HC) being supplied by the in-pipe injection device 13 or through post-injection, the DOC 15 oxidizes the unburned fuel, thereby causing the exhaust gas temperature to rise. The DOC 15 also oxidizes NO in the exhaust gas to produce $NO_2$, thereby causing the ratio of $NO_2$ to NO in the exhaust gas to increase.

The DPF 16 includes, for example, a number of cells defined by porous partition walls disposed along a flowing direction of the exhaust gas. The cells are plugged alternatingly at the upstream side and the downstream side. The DPF 16 collects PM in the exhaust gas into the small cavities and on the surfaces of the partition walls. Upon the amount of accumulated PM reaching a predetermined amount, a so-called forced regeneration for burning and removing the PM is performed. The forced regeneration is performed by supplying unburned fuel (primarily HC) to the DOC 15 by the in-pipe injection device 13 or through post-injection and by raising the temperature of the DPF 16 to the PM-burning temperature (e.g., approximately 600 degrees C.).

The DPF 16 of this embodiment is provided with a pair of electrodes 17a and 17b disposed inside a corresponding pair of cells that oppose each other with at least one cell interposed therebetween. The paired electrodes 17a and 17b form a capacitor. The paired electrodes 17a and 17b are electrically connected to the ECU 40.

The DPF inlet temperature sensor 18 detects the temperature of the exhaust gas flowing into the DPF 16 (hereinafter referred to as "inlet temperature $T_{IN}$"). The DPF outlet temperature sensor 19 detects the temperature of the exhaust gas flowing out of the DPF 16 (hereinafter referred to as "outlet temperature $T_{OUT}$"). The inlet temperature $T_{IN}$ and the outlet temperature $T_{OUT}$ are introduced to the ECU 40 that is electrically connected to the DPF inlet temperature sensor 18 and the DPF outlet temperature sensor 19.

The post-stage post-treatment device 20 includes a urea water spraying device 21 and an SCR catalyst 22 disposed in a casing 20a. The urea water spraying device 21 is arranged upstream of the SCR catalyst 22.

The urea water spraying device 21 sprays or injects urea water (urea solution) from a urea water tank (not illustrated) into the exhaust passage 12 between the pre-stage post-treatment device 14 and the post-stage post-treatment device 20, in response to an instruction signal from the ECU 40. The sprayed urea water undergoes hydrolysis with the heat of the exhaust gas, and ammonia ($NH_3$) is produced. Ammonia ($NH_3$) is then supplied to the SCR catalyst 22 on the downstream side as a reducing agent.

The SCR catalyst 22 includes, for example, a ceramic carrier having a honeycomb structure, with a copper zeolite or an iron zeolite supported on a surface of the ceramic carrier. The SCR catalyst 22 adsorbs ammonia ($NH_3$) supplied as the reducing agent and reduces and purifies NOx in the exhaust gas passing therethrough with the adsorbed ammonia ($NH_3$).

The ECU 40 controls the engine 10, the in-pipe injection device 13, the urea water spraying device 21, and other components, and includes known CPU, ROM, RAM, input port, output port, and so on. The ECU 40 further includes, as part of its functional elements, an electrostatic capacity calculating unit 41, a PM accumulation amount calculating unit 42, a $NO_2$ consumption amount estimating unit 43, a NOx inflow ratio calculating unit 44, and a NOx inflow ratio adjusting unit 45. The description continues with a premise that these functional elements are included in the ECU 40, which is an integrated piece of hardware, but some of these functional elements can be provided in a separate piece of hardware. In this embodiment, the electrostatic capacity calculating unit 41 and the electrodes 17a and 17b constitute an electrostatic capacity detecting unit according to the present invention.

The electrostatic capacity calculating unit 41 calculates an electrostatic capacity (capacitance) C between the electrodes 17a and 17b on the basis of signals entered from the paired electrodes 17a and 17b. The electrostatic capacity C is calculated by Expression 1, where $\epsilon$ represents a dielectric constant of a medium between the electrodes 17a and 17b, S represents the area of the electrodes 17a and 17b, and d represents the distance between the electrodes 17a and 17b.

$$C = \varepsilon \times \frac{S}{d} \qquad \text{Expression 1}$$

The PM accumulation amount calculating unit 42 calculates the amount of accumulated PM collected by the DPF 16, on the basis of the electrostatic capacity C calculated by the electrostatic capacity calculating unit 41 and an average $T_{AVE}$ of the inlet temperature $T_{IN}$ detected by the DPF inlet temperature sensor 18 and the outlet temperature $T_{OUT}$ detected by the DPF outlet temperature sensor 19. The amount of accumulated PM can be calculated by using an approximation formula, a map, or the like, which may be prepared or obtained in advance through an experiment or the like.

The $NO_2$ consumption amount estimating unit 43 estimates the amount of $NO_2$ consumed by the PM that has accumulated in the DPF 16, on the basis of the amount of accumulated PM calculated by the PM accumulation amount calculating unit 42. More specifically, the ECU 40 stores a consumption amount map (see FIG. 2) that defines relation between the amount of accumulated PM and the amount of consumed $NO_2$, which is obtained in advance through an experiment or the like. The $NO_2$ consumption amount estimating unit 43 reads a value corresponding to the amount of accumulated PM from the consumption amount map and thus estimates the amount of consumed $NO_2$.

The NOx inflow ratio calculating unit 44 calculates the ratio of NO to $NO_2$ in the exhaust gas that has passed through the DPF 16 and flows into the SCR catalyst 22. The calculation method will be described below in further detail. The NOx inflow ratio calculating unit 44 first calculates the amount of NO and the amount of $NO_2$ in the exhaust gas emitted from the engine 10, on the basis of the running condition of the engine 10. The NOx inflow ratio calculating unit 44 also calculates the amount of $NO_2$ produced from NO through oxidation by the DOC 15. The NOx inflow ratio calculating unit 44 then calculates the amount of $NO_2$ flowing into the DPF 16 from the calculated amounts of NO, $NO_2$, and produced $NO_2$. The NOx inflow ratio calculating unit 44 further calculates the ratio of NO to $NO_2$ in the exhaust gas flowing into the SCR catalyst 22 by subtracting the amount of $NO_2$ consumed by the PM from the calculated amount of $NO_2$ flowing into the DPF 16.

The NOx inflow ratio adjusting unit 45 controls the combustion state of the engine 10 such that the ratio of NO to $NO_2$ calculated by the NOx inflow ratio calculating unit 44 approaches 1 to 1. Accordingly, the ratio of NO to $NO_2$ in the exhaust gas flowing into the SCR catalyst 22 is kept at an ideal ratio of 1 to 1, and the purification rate of NOx by the SCR catalyst 22 improves. The control for bringing the ratio of NO to $NO_2$ at 1 to 1 can be implemented, for example, by adjusting parameters, such as the fuel injection timing of the engine 10 (ignition timing), the amount of recirculated exhaust gas, and the air-fuel ratio.

Operations and advantages of the exhaust gas purification device of an internal combustion engine according to this embodiment will now be described.

Conventionally, in an exhaust gas purification system that has a DPF disposed on an upstream side and an SCR catalyst disposed on a downstream side, $NO_2$ is consumed by PM that has accumulated in the DPF. Thus, it is difficult to keep the ratio of NO to $NO_2$ of the exhaust gas that flows into the SCR catalyst at 1 to 1. Therefore, the reaction of ammonia ($NH_3$) with NO and $NO_2$ decreases in the SCR catalyst. This can lead to a problem, i.e., the purification rate of NOx deteriorates. The amount of PM that has accumulated in a DPF is typically estimated on the basis of a pressure difference across the DPF detected by a differential pressure sensor. However, the flow rate of the exhaust gas varies with the running condition. This can lead to another problem, i.e., an accurate amount of accumulated PM cannot be grasped on the basis of the pressure difference across the DPF.

On the contrary, the exhaust gas purification device of the internal combustion engine according to this embodiment calculates the amount of accumulated PM from the electrostatic capacity C between the electrodes 17a and 17b that is not affected by the flow rate of the exhaust gas, and keeps the ratio of NO to $NO_2$ that flow into the SCR catalyst 22 at 1 to 1 with the amount of $NO_2$ consumed by the PM taken into consideration.

Therefore, the exhaust gas purification device of the internal combustion engine according to this embodiment can precisely detect the amount of PM that has accumulated in the DPF 16, and keep the ratio of NO to $NO_2$ that flow into the SCR catalyst 22 at an ideal ratio of 1 to 1. Thus, the NOx purification rate can effectively be improved. Furthermore, because the reaction of ammonia ($NH_3$) with NO and $NO_2$ is facilitated in the SCR catalyst 22, excess ammonia can effectively be reduced.

It is to be noted that the present invention is not limited to the above-described embodiments and can be implemented with changes and modifications, as appropriate, within the scope that does not depart from the spirit of the present invention.

Figure 3:
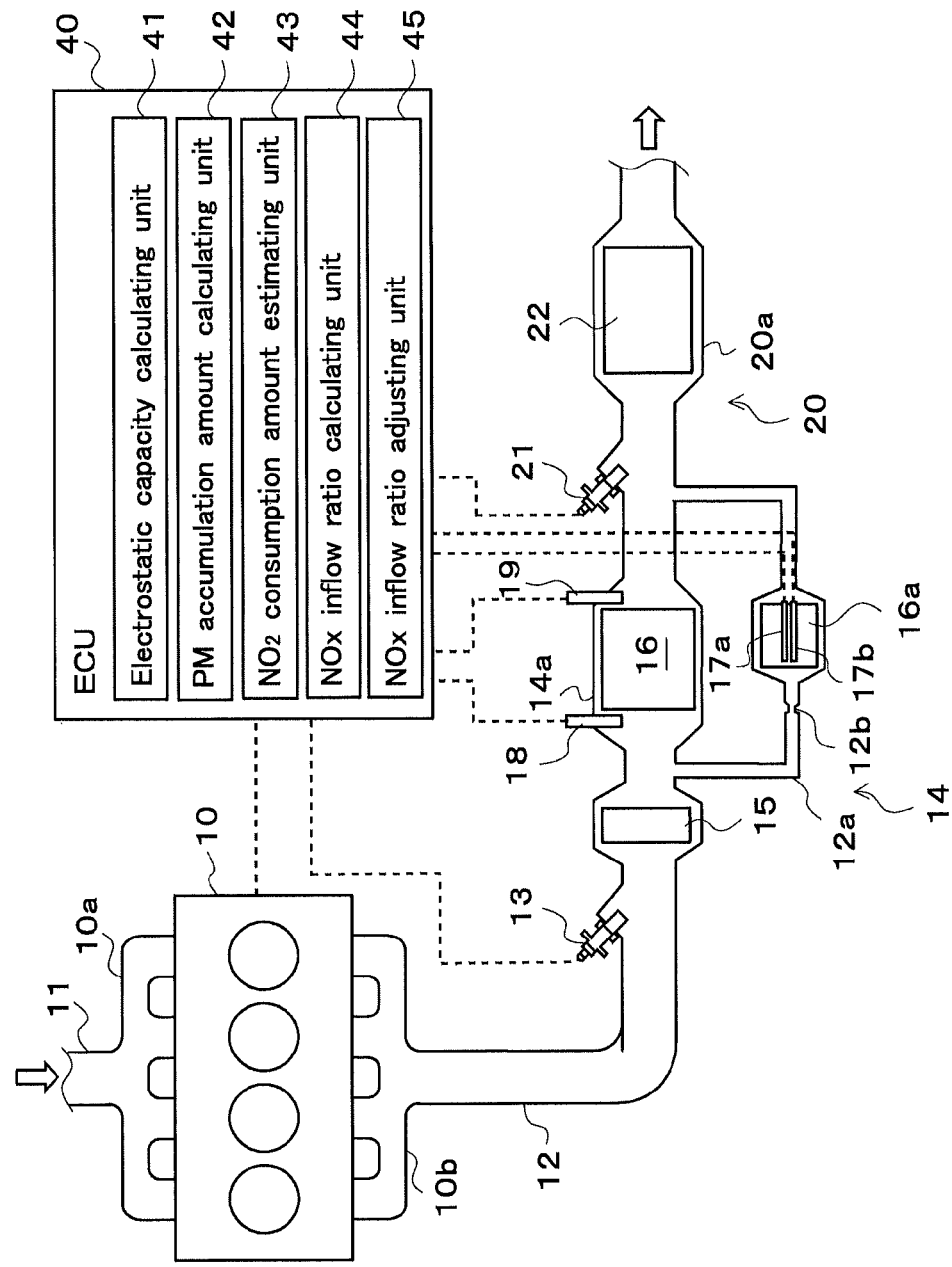
FIG. 3 is an overall configuration diagram schematically illustrating an exhaust gas purification device of an internal combustion engine according to another embodiment of the present invention.

For example, as illustrated in FIG. 3, a bypass passage 12a may be connected to the exhaust passage 12 so as to bypass the DPF 16, and a DPF 16a for measurement (second filter) with a small capacity may be provided in the bypass passage 12a. In this case, it is preferred that a pair of electrodes 17a and 17b be disposed inside a corresponding pair of cells that oppose each other with at least one cell in the DPF 16a interposed therebetween. It is also preferred that the bypass passage 12a be provided with an orifice 12b (throttle) that regulates the flow rate of the exhaust gas. When the forced regeneration of the DPF 16a is executed, the paired electrodes 17a and 17b may be used as a heater by applying a voltage across the electrodes 17a and 17b.

The engine 10 is not limited to a diesel engine, and an embodiment can be widely applied to other internal combustion engines including a gasoline engine.

What is claimed is:

1. An exhaust gas purification device of an internal combustion engine, comprising:
   a first filter in an exhaust passage of the internal combustion engine and configured to collect particulate matter in an exhaust gas;
   a urea water injector at the exhaust passage downstream of the first filter and configured to spray urea water into the exhaust gas;
   a selective catalytic reduction catalyst in the exhaust passage downstream of the urea water injector and configured to reduce and purify a nitrogen compound in the exhaust gas by using ammonia produced from the urea water;
   a bypass passage that branches off from the exhaust passage at a position upstream of the first filter so as to bypass the first filter and return to the exhaust passage upstream of the selective catalytic reduction catalyst;
   a second filter in the bypass passage and configured to collect particulate matter in the exhaust gas flowing through the bypass passage;
   an electrostatic capacity detector configured to detect an electrostatic capacity of the second filter; and
   an electronic control unit configured to
      calculate an amount of accumulated particulate matter collected by the second filter, based on the detected electrostatic capacity,
      estimate an amount of nitrogen dioxide consumed by the particulate matter that has accumulated in the second filter, based on the calculated amount of accumulated particulate matter, and
      control a combustion state of the internal combustion engine such that a ratio of nitrogen monoxide to nitrogen dioxide in the exhaust gas flowing into the selective catalytic reduction catalyst approaches 1 to 1, based on the estimated amount of consumed nitrogen dioxide,
   wherein the electrostatic capacity detector includes a pair of electrodes disposed in a corresponding pair of cells that oppose each other with at least one cell in the second filter interposed therebetween.

2. The exhaust gas purification device of an internal combustion engine according to claim 1, wherein when a forced regeneration of the second filter is carried out, the pair of electrodes functions as a heater.

3. The exhaust gas purification device of an internal combustion engine according to claim 1, wherein a capacity of the second filter is smaller than a capacity of the first filter.

4. The exhaust gas purification device of an internal combustion engine according to claim 1 further comprising an orifice disposed in the bypass passage for adjusting a flow rate of the exhaust gas flowing through the bypass passage.

5. The exhaust gas purification device of an internal combustion engine according to claim 1, wherein the internal combustion engine is a diesel engine.

6. The exhaust gas purification device of an internal combustion engine according to claim 5, wherein the first filter and the second filter are diesel particulate filters.

* * * * *